United States Patent [19]

Hammond et al.

[11] Patent Number: 5,057,697

[45] Date of Patent: Oct. 15, 1991

[54] DC UNINTERRUPTED POWER SUPPLY HAVING INSTANTANEOUS SWITCHING FOLLOWED BY LOW IMPEDANCE SWITCHING

[75] Inventors: Russell E. Hammond, La Jolla; Robert L. Northup, San Diego, both of Calif.; Alan G. Shimp, Silver Springs, Md.

[73] Assignee: The United States of America as represented by the Secretary of the Navy, Washington, D.C.

[21] Appl. No.: 497,374

[22] Filed: Mar. 22, 1990

[51] Int. Cl.$^5$ .............................. H02J 7/10; H02J 9/06
[52] U.S. Cl. ......................................... 307/66; 307/64
[58] Field of Search ................................... 307/64–66, 307/85–87; 320/13

[56] References Cited

U.S. PATENT DOCUMENTS

| | | | |
|---|---|---|---|
| 4,316,097 | 2/1982 | Reynolds | 307/66 |
| 4,454,452 | 6/1984 | Feldstein | 307/66 |
| 4,496,168 | 1/1985 | D'Antonio et al. | 307/66 |
| 4,595,872 | 6/1986 | Ball | 307/66 |
| 4,617,473 | 10/1986 | Bingham | 307/66 |
| 4,644,440 | 2/1987 | Kenney et al. | 307/66 |
| 4,754,160 | 6/1988 | Ely | 307/64 |
| 4,788,450 | 11/1988 | Wagner | 307/66 |
| 4,823,019 | 4/1989 | Gronskog et al. | 307/66 |
| 4,841,160 | 6/1989 | Yon et al. | 307/66 |

Primary Examiner—A. D. Pellinen
Assistant Examiner—Richard T. Elms
Attorney, Agent, or Firm—Harvey Fendelman; Thomas Glenn Keough; Peter A. Lipovsky

[57] ABSTRACT

An uninterruptible power supply is provided that incorporates switching circuitry permitting a path for instantaneous DC backup power to be supplied to a voltage-declining primary power supply bus. Once the instantaneous transition is made, battery power is switched to a low impedance path to provide long-term battery power delivery to the bus. At a point where the backup batteries no longer supply useful power to a load, disabling circuitry disconnects the batteries from the load so that excessive draining of the batteries does not result in irreversible battey damage. The uninterruptible power supply of the invention further includes an automatic battery charging circuitry that seeks to maintain the power supply batteries at optimal charge level. To enable an operator to adequately assess battery charge condition, the invention provides battery test circuitry that causes a simulated load to appear at the power supply batteries. Visual representations are then made as to battery status.

4 Claims, 4 Drawing Sheets

DC UNINTERRUPTED POWER SUPPLY HAVING INSTANTANEOUS SWITCHING FOLLOWED BY LOW IMPEDANCE SWITCHING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention pertains broadly to the field of direct current (DC) power supplies. In greater particularity, the invention relates to switching circuitry for controlling the application of backup DC power to a load.

1. Description of the Prior Art

Increasingly greater reliance upon electrical devices has made these items of greater and greater importance. For some applications, the effect of power interruption to a device can be tremendous. This is particularly true in military defense settings. As is well known, many electrical devices in defense applications are heavily relied upon to provide information at instantaneous rates. Lapses of power to these devices will result in not only terminating the receipt of this information but may also destroy ongoing calculations such as those that are stored in temporary electronic memory.

Once power shutdown occurs, restoration efforts must begin immediately or a substantial loss of information may occur and, in military scenarios, a loss of offensive or defensive capability.

As it is for many electrical devices, such as computers and the like, DC power is used as a source of energization energy. To prepare for the unexpected loss of power to these electrical components, it is typical that battery powered backup power supplies be utilized. In situations where backup power supplies are used, it is necessary that there be switching circuitry enabling a switch from system primary power to the auxiliary source of power.

In some military applications, as well as other non-military applications, it is desirable that switching circuitry permit an instantaneous diversion of system power. This, of course, is necessary so that no loss of circuit-supplied information or capabilities occurs.

Besides permitting such instantaneous transition, it is desirable that battery powered backup power supplies include disabling circuitry that cuts-off battery supplied power before excessive battery discharge is experienced.

Where such auxiliary battery power supplies may be in place for a substantial time it is also desirable that charger circuitry be provided to maintain the batteries at their optimum power levels. Additionally, in such circumstances, it is desirable that battery test circuitry be provided so that the battery power may be tested periodically to reveal battery charge status.

SUMMARY OF THE INVENTION

The invention provides all of the above described desired backup power supply features. Switching circuitry provides a path for instantaneous DC backup power to be supplied to a voltage-declining primary power supply bus. Once the instantaneous transition is made, battery power is switched to a low impedance path to provide long-term battery power delivery to the bus.

At a point where the backup batteries no longer supply useful power to a load, disabling circuitry disconnects the batteries from the load so that excessive draining of the batteries does not result in irreversible battery discharge. The uninterruptible power supply of the invention further includes an automatic battery charging circuit that seeks to maintain the power supply batteries at optimal charge level. Further, to enable an operator to adequately assess battery charge condition, the invention provides battery test circuitry that causes a simulated load to appear at the power supply batteries. Visual representations are then made as to battery status.

OBJECTS OF THE INVENTION

It is an object of the invention to provide an improved backup power supply.

Another object of the invention is to provide a backup power supply that provides instantaneous backup power to electronic circuitry.

Yet a further object of the invention is to provide an instantaneous battery powered backup power supply that includes battery charge preservation and monitoring circuitry.

Other objects, advantages and new features of the invention will become apparent from the following detailed description of the invention when considered in conjunction with the accompanied drawings.

DESCRIPTION OF THE PREFERRED EMBODIMENT

This description incorporates design details according to one specific implementation of the invention. This representative embodiment is shown and discussed so as to enable those skilled in the power supply art to appreciate and understand the nature of this invention. It should be understood, however, that the particular embodiment shown is merely a representative example of the invention and is by no means intended to imply that other modifications and variations of the invention are not possible.

In order to aid the artisan's understanding of this invention, familiar identifiers such as component values, pin numbers and the like have been left basically intact. To distinguish these identifiers from those used to facilitate discussion of the invention the "discussion" element numbers will begin with the numeral 100.

Figure 1A:
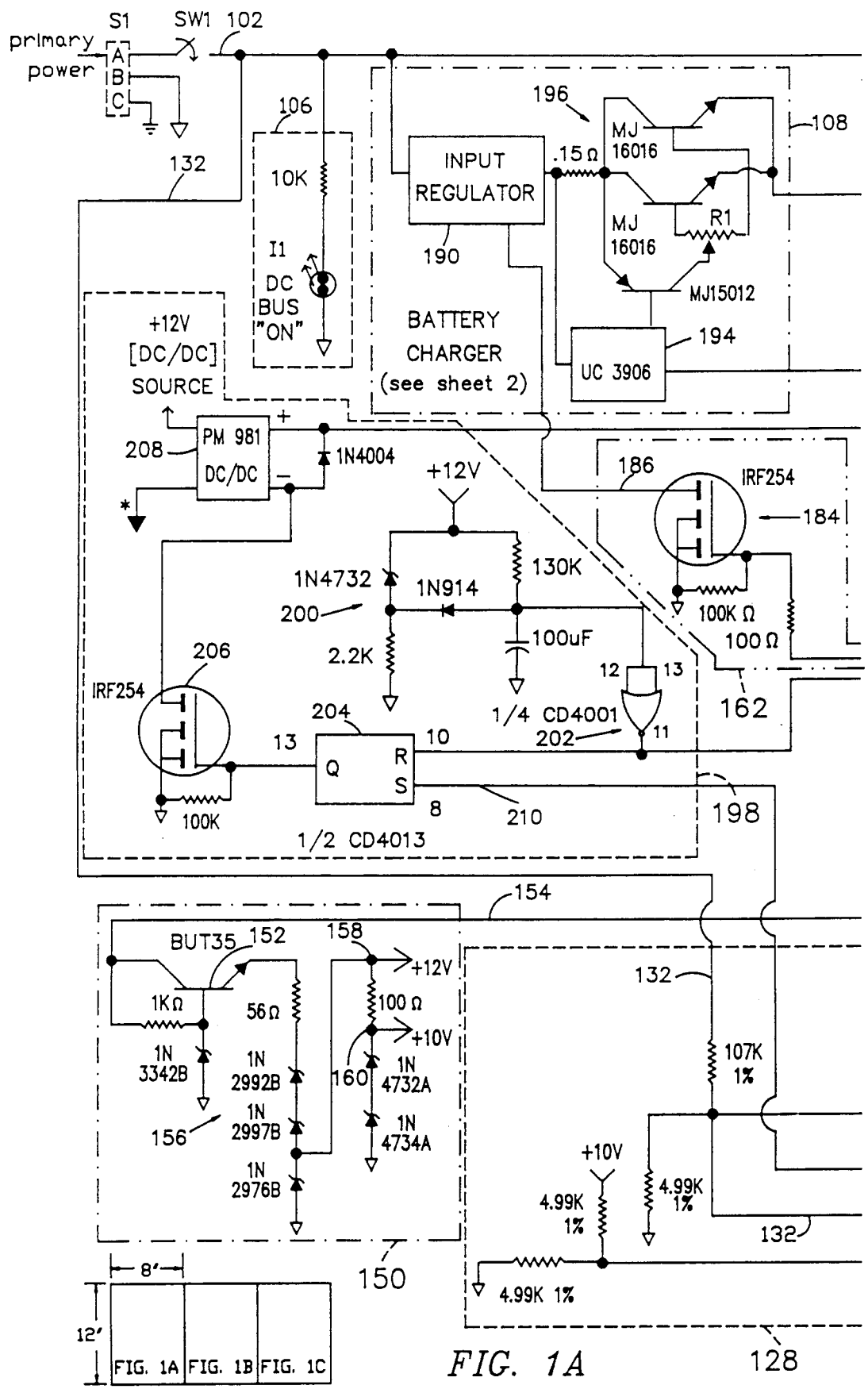
FIG. 1 is a schematic representation of an uninterruptible power source according to a representative embodiment of the invention.
Figure 1B:
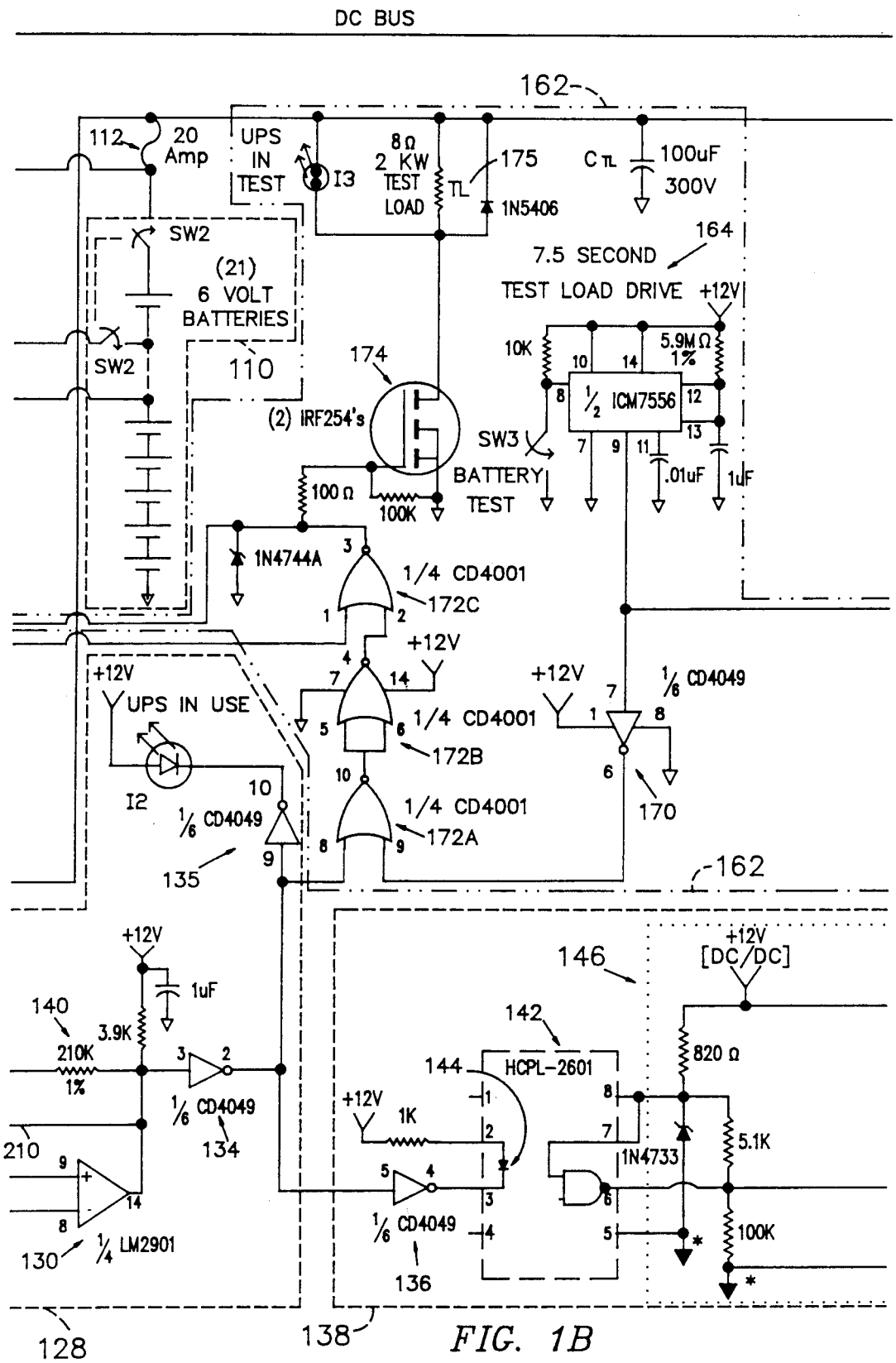
Figure 1C:
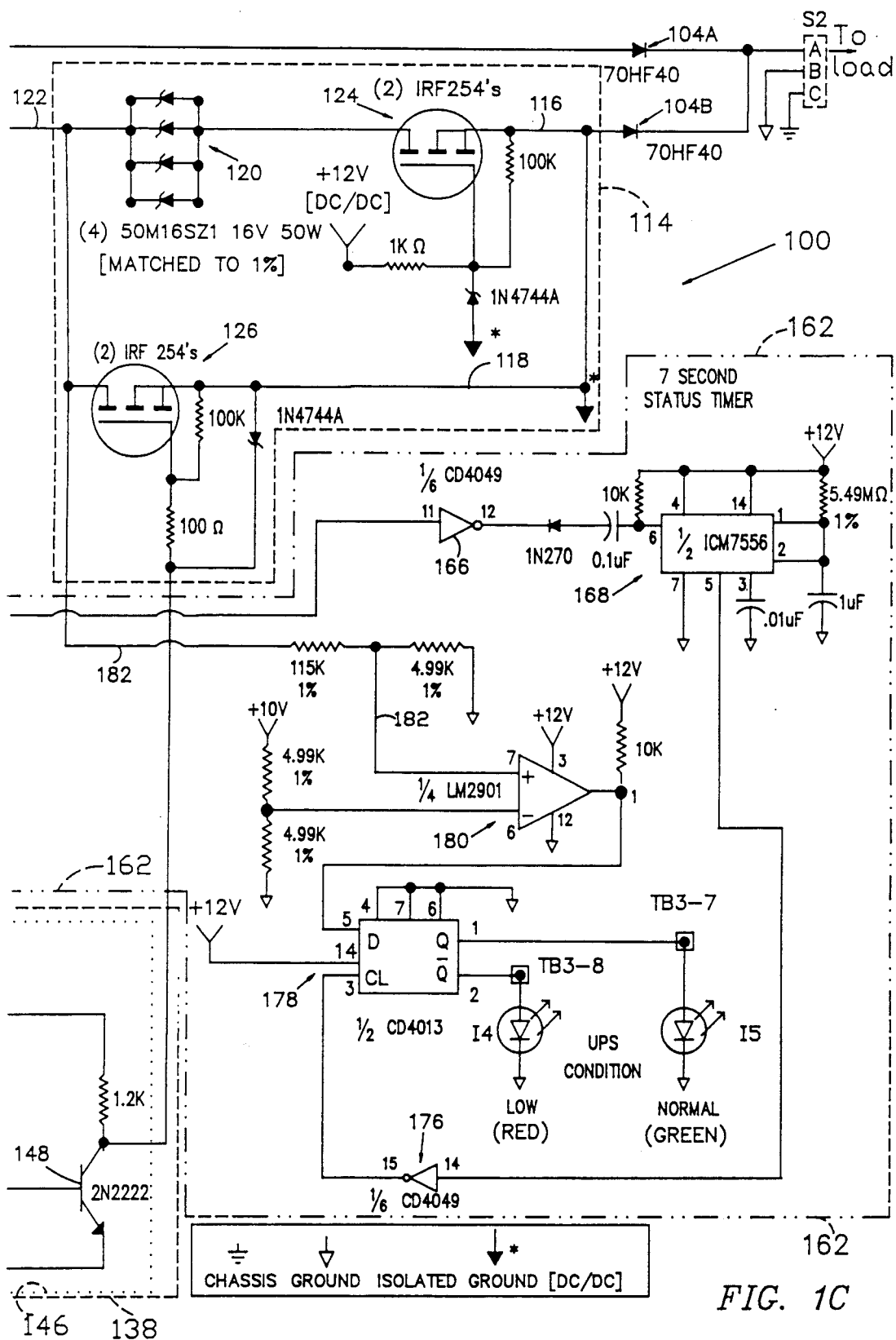

Turning now to the details of this invention, one is referred to FIG. 1. FIG. 1 presents an overall schematic of an uninterruptible power supply 100 according to the invention. Primary power is applied to pin A of connector S1 with pins B and C of S1 providing traditional ground and chassis ground, respectively. In the particular environment in which power supply 100 has been utilized, primary power applied to S1 fell within the range of 141 to 155 volts DC. The closing of switch 1

(SW1) flags this primary power voltage to a DC bus 102 of uninterruptible power supply (UPS) 100. Under the normal system operating conditions when UPS 100 is not being utilized, the primary power passes through DC bus 102 through one (104A) of a pair of "OR-ing" diodes 104 and on to pin A of connector S2. Also connected to pin A of S2 is a load in the form of one or more electronic devices. These devices would be of a nature that requires uninterruptible power supply 100 to provide power in the event that primary power through DC bus 102 falls below an acceptable level. Light circuit 106 includes a visual indicator I1 that glows when bus 102 is active. When electrical devices coupled to UPS 100 are operating normally, UPS 100 is essentially on stand-by. The only active element of the UPS at that time will be battery charger circuit 108 to be later discussed. If the primary power on DC bus 102 falls either momentarily or permanently below a predetermined voltage, UPS 100 will be turned on. Power from battery bank 110 would then be applied through corresponding "OR-ing" diode 104B to a load by way of pin A of S2.

In the specific embodiment of the invention shown, a drop in DC bus 102 below 111 volts would cause UPS 100 to be turned on. In this embodiment batteries 110 consist of a string of 21 serially connected 6-volt DC batteries. Switch 2 (SW2) is normally kept closed so that battery charger circuit 108 automatically replenishes the charge of the serially connected batteries. The closing of SW2 also permits battery power to flow through 20-amp protection fuse 112 to power transition switch circuit 114.

In accordance with the invention power transition circuit 114 provides two separate paths by which batteries 110 may supply power to the load appearing at S2. Path 116 permits an instantaneous transition to the load from the primary power supplied over bus 102 to the battery power supplied by batteries 110. As will be further explained, path 118, upon an appropriate signal from a comparator circuit to be described, operably replaces path 116 to provide batteries 110 with a low impedance connection to the load appearing at S2.

Referring now to the greater detail of power transition switch circuitry 114 it can be seen that a bank of power sharing parallel connected Zener diodes 120 are operably coupled to battery string 110 by way of conductor 122.

In the event that the primary power delivered through DC bus 102 drops a predetermined amount, Zener bank 120 instantaneously delivers battery power to the load appearing at S2. For example, should the 21 6-volt series connected batteries of 110 provide 133 volts to the cathodes of the individual Zeners indicated as part of Zener bank 120, a voltage drop to 117 volts DC would appear at the Zener's anodes. Once primary power over DC bus 102 falls below this 117-volt DC level, the breakdown potential of the individual Zeners would be exceeded, causing an instantaneous path for backup power from battery string 110.

The current passing through Zeners 120 over path 116 is conducted through two parallel-connected field effect transistors (FETs) 124. The two FETs 124 are supplied with a gate voltage from a floating 12-volt DC source (+12V [DC/DC]) to be discussed. Suffice it to say at this point in the description that FETs 124 are normally on. However, these FETs are also utilized in battery cutoff circuitry to be described.

Power transition switching circuit 114, as mentioned, also includes a low impedance path 118 that includes two FETs 126. Comparator circuitry to be described activates FETs 126 to circumvent the otherwise power consuming Zeners of bank 120.

In this sense once DC bus 102 has dropped sufficiently to permit battery string 110 to overcome the breakdown potential of Zener bank 120, a power loss as well as a voltage drop will appear at the Zener bank. Zener bank 120 provides an effective way of instantaneously transitioning power from batteries 110 to a load in need, however, the voltage drop across Zener bank 120 results in a significant reduction in useful backup power delivery time from batteries 110. To circumvent this reduction in power delivery time, low impedance path 118, including FETs 126, is utilized to bypass the Zeners permitting a longer term draw of power from batteries 110.

Turning now to the details of the aforementioned comparator the reader is directed to comparator circuit 128. Comparator circuit 128 includes a conventional voltage comparator 130. Sensing from DC bus 102 is provided to pin 9 of comparator 130 by way of connecting line 132. The primary power voltage sensed over connector 132 passes through a conventional voltage divider made up of the operably connected 4.99 k and 107 k ohm resistors that provide a voltage input to comparator 130. The voltage input at pin 9 is compared to a reference voltage provided at pin 8 of the comparator. A +12 volt input power is provided to comparator 130 through the operably coupled 3.9 k ohm resistor and 1 µF capacitor.

In this specific embodiment of the invention, if DC bus 102 remains above 111 volts DC no output from comparator 130 occurs. However, when the input at pin 9 of comparator 130 falls below this reference voltage, FETs 126 of power transition circuit 114 assume an "on" position. The precise mechanism for performing this operation will be described, however it is worthy to presently note the significance of this operation.

Assuming that primary power to DC bus 102 is in a falling condition, that is, the primary power provided to the load at S2 has dropped to, for example, a voltage that is at least 16 volts less than the voltage supplied by battery string 110, Zeners 120 will immediately provide a path by which battery voltage will be supplied to the load. Also assuming that the primary power is declining to a low or zero-voltage condition, in this example when primary power passes through 111 volts, conductor 132 of comparator circuit 128 will sense this decline and relieve Zener bank 120 by providing less resistive low impedance path 118 to batteries 110 by way of activation of FETs 126.

In this process the positive output of comparator 130 is fed to an inverter 134 whose output is in turn passed to an inverter 135 and light emitting diode I2, the latter indicating use of UPS 100. The output of comparator 130 is also fed, through inverter 134, to an inverter 136 of a switch driver and DC isolation circuit 138.

It should be noted that resistor 140 of comparator circuit 128 provides a hysteresis function so &:hat a definite separation will exist between the voltage levels on bus 102 that are required to switch UPS 100 on and off, preventing UPS oscillation.

Switch driver and DC isolation circuit 138 includes an HCPL-2601 opto-isolator 142. As is known in the art, the isolator permits two different DC potentials to exist in different parts of a circuit. Opto-isolator 142 is implemented so as to permit photocoupled signals to pass between, in this instance, a grounded circuit and a floating ground/isolated ground system. The inverted output at pin 4 of inverter 136 is photocoupled to the output of opto-isolator 142 by way of the DC input applied at pin 2 of the opto-isolator through its opto-isolator diode 144. The output of the opto-isolator at pin 6 is converted into a logic level that, through switch driver circuitry 146, drives transistor 148. The collector of transistor 148 in turn drives the gates of FETs 126 of power transition circuit 114.

At the instant that FETs 126 are turned on, instantaneous path 116, including Zener bank 120, drops out as it is essentially bypassed by the low impedance circuit of pass transistors 126 providing the primary output path from batteries 110 to the load at S2.

The low voltage DC requirements for UPS 100 are provided by input voltage generation circuitry 150. Transistor 152, a BUT35, takes input voltage from battery string 110 by way of connection 154. Transistor 152 regulates this voltage and provides it in a well understood fashion to a precise Zener string 156, tapped to provide well-regulated supply voltages at 158 and 160. The +12-volt provided at 158 is for internal circuitry whereas the +10-volt at 160 is used as a precision reference throughout UPS 100.

Referring now to the block designated as 162, the battery test circuitry of the invention will be described. Battery test circuitry 162 is operator initiated by way of switch 3 (SW3). Test circuitry 162 incorporates two timers. The closing of SW3 starts a 7.5-second count in timer 164 with pin 9 of timer 164, starting, through inverter 166 and a pulse coupling circuit consisting of a 1N270 diode / 0.1 μF capacitor, a simultaneous 7-second count in timer 168. The details of these timing operations will be later explained, however, in summary, timer 164 applies an 8-ohm test load 175 to simulate an external load on batteries 110. This load is maintained for 7.5 seconds before being switched off. Seven seconds after the initiation of this battery test sequence, timer 162, through circuitry to be described, causes a reading of the batteries' condition to be taken.

Referring now to the greater details of 7.5-second timer 164 the closing of SW3 causes an input at pin 8 of the timer, causing the timer to be set to its time delay state. The timer is powered by +12V from 158 of voltage generation circuit 150, and the time delay is set according to the manufacturer's data sheet with a 5.9 megohm resistor and 1 μF capacitor timing network. Output pin 9 of timer 164 feeds in two different directions. As described previously, one direction passes through inverter 166 to 7-second timer 168 to begin time delay within this timer simultaneously with the time delay of timer 164.

Pin 9 of timer 164 also feeds through inverter 170 to a succession of NOR gates 172. NOR gates 172 provide a battery test inhibit function when UPS 100 is actively providing power to the load at S2 or when battery power is low. The low battery voltage inhibit will be further explained but assuming that battery voltage levels are normal, pin 1 of NOR 172C is low. When neither UPS 100 is actively providing power nor when batteries 110 are below a specified voltage output level, NOR gates 172 drives the gates of parallel FETs 174, switching FETs 174 into their conducting states, applying a ground to test load 175. This action applies test load 175 to batteries 110. Load 175 will then be applied to batteries 110 for the duration of the 7.5-second count provided by timer 164 with lamp I3 indicating the ongoing test. Capacitor $C_{TL}$ serves as a surge suppressor.

The high state of pin 9 of timer 164 during this 7.5 second time delay is applied to 7 second timer 162 to begin a time delay within this timer. Timer 162 utilizes internal source voltage through the manufacturer's prescribed 5.49 megohm and 1 μF timing network for a 7 second timing pulse. Output 5 passes through inverter 176 to clock flip-flop 178. At this time a comparator 180 provides flip-flop 178 with an input according to the voltage sensed on DC bus 102 through line 182. This input state is latched into flip-flop 178 at the end of the 7 second time delay in timer 162.

In this application, if batteries 110 are above approximately 120 volts the Q output of flip-flop 178 energizes LED I5 to visually indicate to an operator that battery condition is normal. In contradistinction if batteries 110 are below roughly 120 volts, Q-bar of 178 energizes I4 to indicate to an operator that a low battery condition exists.

Referring again to NOR gate series 172, output pin 3 of NOR gate 172C, besides feeding the gate of FETs 174, feeds the gate of FET 184. FET 184 provides a disable input at 186 to battery charger 108 so as to disable the charger during a battery status check.

Figure 2:
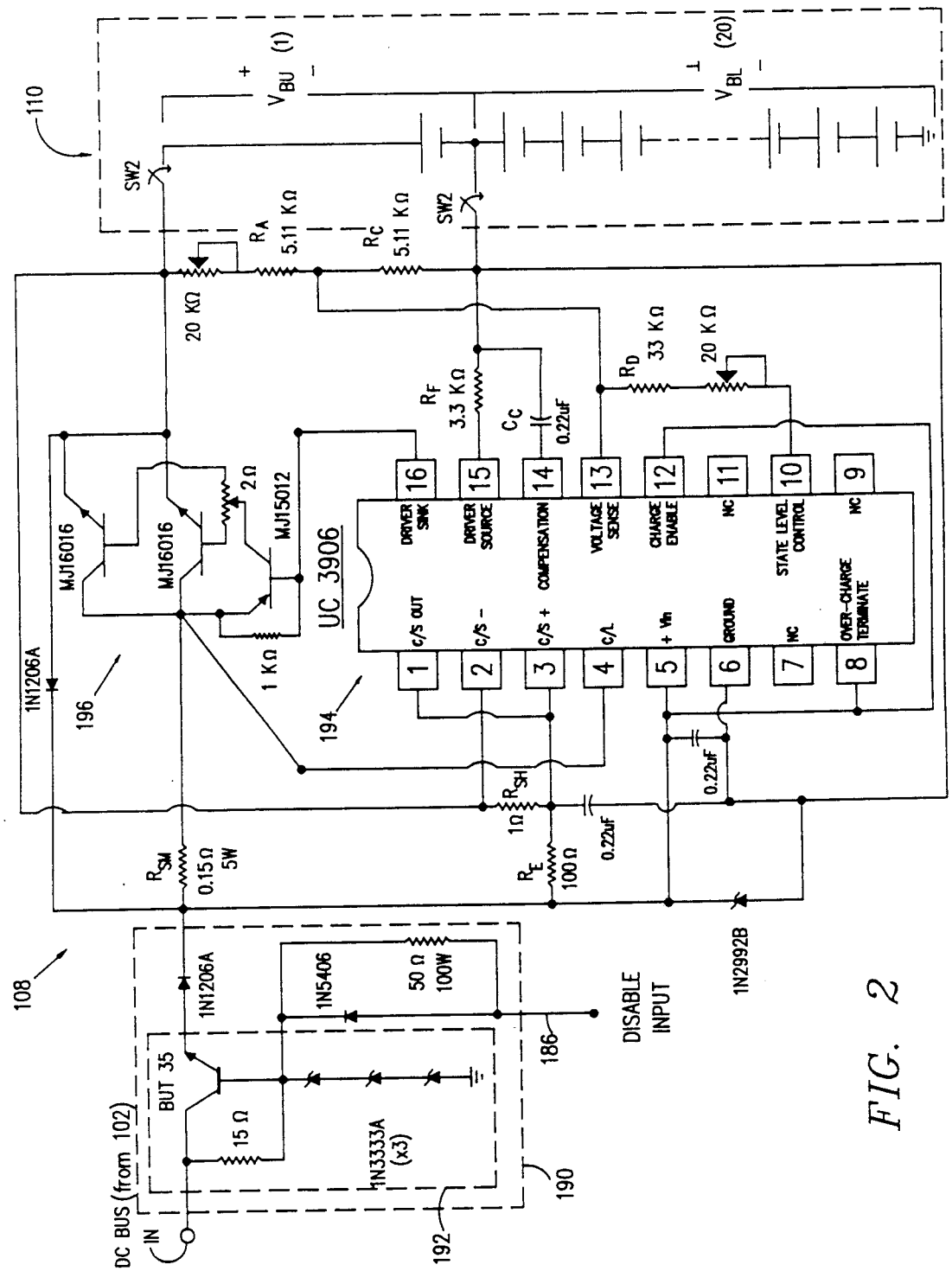
FIG. 2 is a detailed schematic corresponding to FIG. 1 of input regulator/battery charger circuitry in accordance with the representative embodiment of the invention shown in FIG. 1.

Referring now to FIG. 2 greater details of battery charger 108 will be described. Battery charger 108 is powered by way of DC bus 102 fed to input regulator 190. As previously described, during the course of a battery status check, FET 184 of FIG. 1 becomes active to ground input 186 to input regulator 190. The 50-ohm resistor provides a reduced voltage to charger 108 during this status check. The 1N5406 diode in parallel with the 50 ohm resistor acts as a reverse emf suppressor. The BUT35 transistor, 15-ohm resistor and three 1N33-33A's are a pre-regulator network that provide initial regulation of the primary power provided over DC bus 102 so as to prevent excessive voltage swings which could damage battery charger components. Battery charger 108 may include an off-the-shelf battery charger chip such as the UC 3906 here designated as element 194.

In this particular embodiment, the UC 3906 is connected according to the manufacturer's status sheet for the particular application of the invention. In this application charger chip 194 is configured to permit tailored charge profile so as to maximize the life of batteries 110. This charge profile presents a two-state battery charge in which batteries 110 are rapidly charged from a discharged state to a second state trickle-charge level, providing a more moderate rate of charging.

Charging chip 194 requires a reference voltage in order to correctly profile battery charge. This reference is provided by the top battery of battery string 110, string 110 being reproduced in FIG. 2 to facilitate understanding.

Because of the high currents required during battery charging a "pass" element 196 including three transistors, two in parallel, is utilized in a conventional way with charger chip 194.

Referring once again to FIG. 1 the battery control cutoff circuitry of UPS 100 will be described. This circuitry, identified by element 198, provides a floating +12V [DC/DC] source to other power supply elements as well as incorporate a voltage sensing network that senses degradation of battery charge so that the batteries of UPS 100 ma be switched off at a point where they are no longer supplying useful power to an operably coupled load.

Battery cutoff circuitry 198 includes voltage sensing network 200 powered by +12V supplied from voltage generation circuit 150. Voltage sensing circuit 200 senses a drop in this +12V internally supplied voltage. A drop in this voltage is indicative of a corresponding drop in the battery output voltage furnished by UPS 100 to a load.

In this particular embodiment of the invention, if batteries 110 fall to about 107 volts, sensing circuit 200 through NOR gate 202 feeds a reset terminal of flip-flop 204 and switches its Q output to zero. The Q output of flip-flop 204 is in turn connected to a gate of FET 206.

FET 206 is thereby switched off, switching off the isolated DC/DC converter 20 that supplies floating voltage to FETs 124 of power transition circuit 114 and to FETs 126 of the same circuit. The cutoff of this floating voltage prevents an further current from flowing from batteries 110 to a load coupled to S2.

It should be noted that at this time, voltage sensing network 200 will also provide a "high" by way of inverter 202 to pin 1 of NOR gate 172C. This serves to inhibit a battery test from being conducted when batteries 110 have reached a level below 107 volts.

In order to enable UPS 100 to be placed back in stand-by service, DC bus 102 must return back to its normal operating voltage. In this particular embodiment being described, this normal operating voltage is between 141 to 155 volts DC. The return of the DC bus voltage will be sensed by op-amp comparator 130 of comparator circuit 128. The high output then produced by comparator 130 is passed by way of connection 210 to provide a set input to flip-flop 204 of battery cutoff circuitry 198. This set input switches on FET 206 permitting DC/DC converter 208 to become active again.

It can thus be seen that an instantaneous DC uninterrupted power supply is provided by the invention incorporating the desirable features of instantaneous substitution for a primary power supply whose voltage is declining. Once an instantaneous transition is made the invention includes switching circuits that permit a low impedance path for battery backup power to flow to an operably coupled load. In the event that the uninterrupted power supply of the invention is called upon for lengthy service, battery cutoff circuitry senses when irreversible battery damage may occur. The sensing circuitry disables the batteries of the invention before this battery condition is reached.

So that the invention may be utilized in a standby setting for substantial periods of time, an automatic battery charger circuit is provided to the power supply's batteries. Further battery test circuitry is provided so that an operator may periodically diagnose the status of the batteries utilized in the invention. Such battery test circuitry will be disabled in the event that the uninterrupted power supply is called upon to supply backup power to a load.

Though the invention has been described as pertaining to a particular embodiment and implementation of the invention, those skilled in the art will realize that the incorporation of the invention features can be possible in a great many designs and implementations.

For example, though Zener diodes and field effect transistors have been utilized in the switching circuitry of the invention, it can be envisioned that other substitute switches may be used in their place.

The Zener diodes could be substituted with other semiconductor, vacuum or even gas voltage actuated devices. Obviously, those devices of the voltage-breakdown type exhibiting the Zener o avalanche effect lend themselves to be particularly suitable for the application of the invention.

The field effect transistors could be replaced with other type switches such as those of the gate turnoff thyristor (GTO), MOSFET controlled thyristor (MCT) and insulated gate bipolar thyristor (IGBT) type. Further, one skilled in the power supply art will realize that alternate sources of power such as capacitors and the like may be used instead of the DC batteries shown incorporated with the invention described here.

It is obvious that there are many modifications and variations of this invention in light of the above teachings. It is therefore to be understood that within the scope of the appended claims the invention may be practiced otherwise than as has been specifically described.

What is claimed is:

1. A DC backup power supply for supplying power to a load when primary power to the load falls below a predetermined level comprising:
    energy storage means for storing DC energy;
    instantaneous switching means for instantaneously switching said DC energy to said load when said primary power falls below said predetermined level, said switching means including at least one Zener diode operably coupled to conduct said DC energy between said energy storage means and said load;
    comparator means for indicating a fall in said primary power below a second predetermined level that is below said predetermined level; and
    low impedance switching means operably coupled to said comparator means between said energy storage means and said load, for providing a low impedance path around said instantaneous switching means when said primary power falls below said second predetermined level as indicated by said comparator means.

2. A DC backup power supply according to claim 1 further including:
    voltage sensing means for sensing voltage within said energy storage means and for preventing said energy storage means from conducting voltage to said load when said voltage within said energy storage means has fallen below a predetermined voltage level.

3. A DC backup power supply according to claim 2 further including:
    charging means for charging said energy storage means.

4. A DC backup power supply according to claim 3 further including:
    energy storage testing means for testing energy storage power level and for providing signals indicative of said power level; and
    visual representation means for providing a visual representation of the power level of said energy storage means as indicated by said signals from said energy storage testing means.

* * * * *